Jan. 21, 1958  J. DUNN  2,820,874
MANUFACTURE OF CHAINS
Filed July 1, 1953
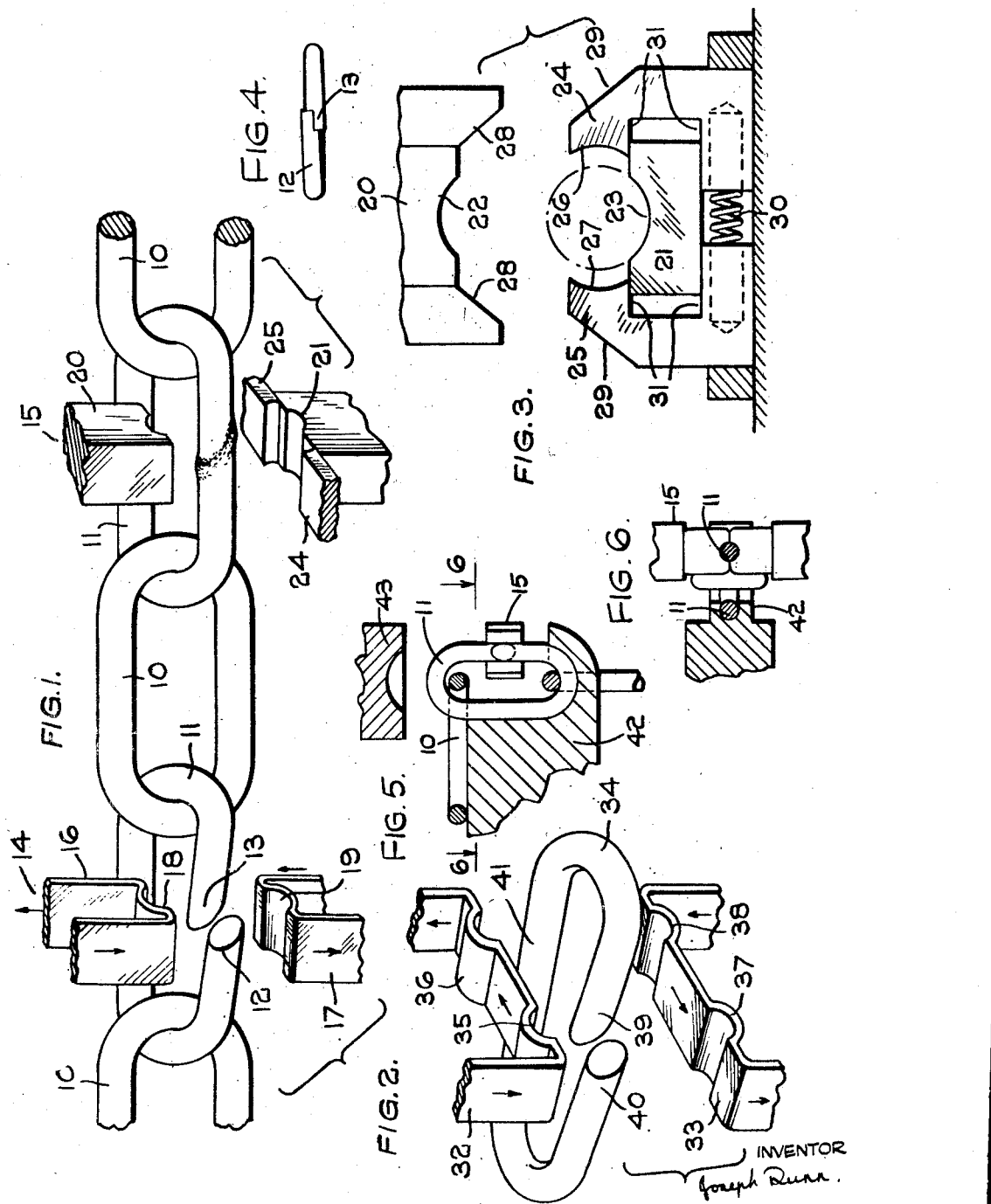
INVENTOR
Joseph Dunn.
BY Richardson David and Worden
his ATTORNEYS

United States Patent Office 2,820,874
Patented Jan. 21, 1958

2,820,874

MANUFACTURE OF CHAINS

Joseph Dunn, Cradley Heath, England, assignor of two-thirds to David Roberts, Jr., Audnam, and one-sixth to Arthur George James, Halesowen, England Application July 1, 1953, Serial No. 365,445

1 Claim. (Cl. 219—9.5)

This invention relates to the manufacture of chains by linking unclosed links with each other or with alternate links which are closed and then closing the unclosed links by a welding process.

Hitherto, and more especially in the manufacture of wrought iron chain, it has been the practice to carry out the whole process of manufacture by what may be termed hand methods, the individual unclosed links being heated by means of a solid fuel fired smith's furnace, and after linking with the already formed chain, closed on an anvil by the use of a sledge hammer and/or associated smith's hand tools, but such link-closing process is slow and expensive.

It is an object of the present invention to provide an improved process for the manufacture of chain, especially wrought iron chain.

It is a further object to provide an improved process for the manufacture of chain by an automatic or continuous system.

Yet a further object is to provide new or improved apparatus for the manufacture of chain.

Other objects and advantages of the invention will hereinafter become more fully apparent from the following description of the drawings which illustrate preferred embodiments of the invention, and wherein:

Figure 1 shows a perspective view of one form of apparatus constructed in accordance with the invention for carrying out the process thereof on chain links having oblique end faces, Figure 2 is a fragmentary view showing an alternative form of current-carrying structure capable of utilisation in the process of which Figure 1 is illustrative and which produces a heating of the limb of a link opposite to that which is unclosed; and Figure 3 shows in end elevation and on an enlarged scale details of a die assembly for producing inwardly-directed welding pressure against an annular or ring-like zone extending around the outer surface presented when the end portions of the link are in abutting relationship.

Figure 4 shows a further form of chain link in which the ends are of stepped formation.

Figure 5 is a fragmentary view of a further form of die assembly for producing inwardly directed and endwise directed welding pressure.

Figure 6 is a sectional view on the lines 6—6 of Figure 5.

In the apparatus and process illustrated in Figure 1 the chain in the course of production is shown as comprising links having spaced parallel limbs connected at their extremities by arcuate portions.

Alternate links, indicated at 10, have been closed prior to interlinking with the other series of alternate links 11, which prior to the completion of the present process are gapped approximately midway between the ends of one of the limbs, the end portions 12 and 13 having opposed parallel or approximately parallel oblique faces spaced apart along the length of the link, and also to a certain extent at right angles to the plane thereof.

In the process illustrated the links are of wrought iron, and instead of employing the faces illustrated, which are oblique with respect to the axis or centre-line of the limb of the link, it would be possible to employ faces of stepped formation as shown in Figure 4 and which when heated and pressed together allow an effective weld to take place having regard to the fibrous structure of wrought iron in which the slag inclusions should extend lengthwise along the limb of the link.

As illustrated, the links are of circular cross-section but it will of course be understood that they could be of any suitable cross-section, for example of elliptical or other oval shape, or even rectangular.

The links are supported in any suitable manner enabling the extended portion of the interlinked chain illustrated in Figure 1 to be given intermittent feed movements proceeding from left to right as viewed in the drawings.

For instance, although not shown, the interlinked chain could be supported at both ends of the extended portion illustrated in Figure 1 on suitable chain-carrying rolls or drums, of which one or both are biased for rotation in a direction to maintain tension in the extended length of chain so that this is supported and positioned in the manner illustrated in the operative field of the current-carrying structure 14 and die assembly 15.

As illustrated in Figure 1, alternate links 11 of the chain are unclosed, and automatic interlinking of these links with the closed links 10 may be performed in any suitable machine or device of generally known type fed with suitable stock from which the unclosed links are formed, and also fed with preformed closed links 10.

Alternatively, although not illustrated in the drawings, all the links of the chain might be of the unclosed type, in which case formation of the links and interlinking of same with each other may likewise be performed in a known machine or device prior to the stage of operation of which Figure 1 is illustrative.

The current-carrying structure illustrated in Figure 1 comprises a pair of strip metal current-carrying elements 16 and 17 formed with arcuate portions 18 and 19 conforming to the cross-sectional shape of the end portions 12 and 13 of the link, and capable of being brought into closely spaced relationship to more or less embrace the end portions 12 and 13 whilst remaining insulated therefrom and from each other. Each end portion of the link may be considered to have two oppositely disposed segments and the element 16 lies closely adjacent one segment on each end portion and the other element lies closely adjacent the other segment on each end portion.

Although not illustrated in the drawings it will of course be understood that any suitable form of mechanism may be provided for advancing the elements 16 and 17 into the operative position closely adjacent to the end portions 12 and 13 and for withdrawing them to the position shown in Figure 1 in which they allow the extended length of chain to be fed endwise.

The current-carrying elements 16 and 17 are fed with suitable high-frequency current, either individually or in series, and in such a manner that the portions 18 and 19 are traversed by currents proceeding in opposite directions, the instantaneous direction of current being for example illustrated by the arrows shown on the elements 16 and 17. It will be appreciated that with this arrangement a high frequency electro-magnetic heating field is created which is of substantially annular formation so as substantially to completely encircle the cross-section of the end portions and at any instant the field extends longitudinally through and between the end portions in a single sense with the field entering into and emerging from the portions around the complete peripheral surfaces thereof to obtain electro-magnetic saturation of said end portions over their entire cross-sectional areas with the maximum flux density being created at the tranverse jointing faces of the end portions whereby said end portions become heated to a welding temperature which attains a maximum at said transverse jointing faces.

The value of the current required and the length of time which the ends 12 and 13 require to remain in the electro-magnetic induction heating field produced by the elements 16 and 17 when in their closed or operative positions will of course vary in accordance with the material and the dimensions of which the links of the chain are formed and have respectively.

However, the approximate value of the current required to produce the required degree of heat will be capable of being assessed by those skilled in the art of induction heating without difficulty, and adjustment to produce the best results in practice can readily be made by the provision of current-controlling means associated with the supply circuits for the elements 16 and 17.

Similarly, the temperature to which the ends 12 and 13 must be raised to permit of effective welding will for most common materials of which the chain is constructed, and especially for wrought iron, be well known to those skilled in the art of chain welding.

After the ends 12 and 13 have been raised to a suitable temperature, for example a white or nearly white heat in the case of wrought iron, which will cause the metal to flow or run together readily, the elements 16 and 17 are automatically moved to their open position as illustrated in Figure 1 and the extended length of chain is fed to bring these ends into the operative range of the die assembly 15.

This die assembly comprises a pair of primary dies 20 and 21 having face portions 22 and 23 respectively for engaging with diametrically opposed regions of the exterior face of the link presented by the end portions 12 and 13 when in abutting relationship.

As illustrated, these face portions are at the upper and lower sides of the link, and the intermediate portions of the face of the link in the region of said ends are adapted to be engaged by secondary dies 24 and 25 having similar face portions 26 and 27.

The primary and the secondary dies are adapted to be moved inwardly to exercise inward welding pressure on an annular or ring-like zone extending substantially completely around the exterior faces of the end portions 12 and 13, firstly to bring these into abutting relationship and then to ensure an effective weld whilst the end portions remain in the heated condition.

As illustrated, the primary and secondary dies are provided with co-operating inclined faces 28 and 29 respectively which ensure that the secondary dies are moved inwardly as the primary dies move towards each other. On withdrawal of the primary dies to the open position illustrated in Figures 1 and 3, the secondary dies are automatically retracted by means of a coiled compression spring 30, the ends of which are seated in suitable recesses in the secondary dies.

Conveniently the secondary dies are formed to engage and support the primary die 21 slidably, each of the secondary dies being provided with a slideway 31 for receiving the lateral extremities of the primary die 21.

For links of relatively great cross-sectional dimensions, for example two to three inches in diameter or more, it is preferable to heat a section of the limb opposite that in which the unclosed ends are situated in order to reduce the value of the pressure required to bring these ends into abutting relationship.

With this end in view an alternative form of current-carrying structure is illustrated in Figure 2, in which current-carrying elements 32 and 33 forming the two parts of a split coil structure similar to that constituted by the elements 16 and 17 are shown in the withdrawn or open position in relation to the link 34 upon which they are about to operate.

Each element includes spaced arcuate parts, as seen particularly at 35 and 36 for the element 32, and 37 and 38 for the element 33.

The arcuate parts 35 and 37 when brought into closely spaced relationship produce a heating field for the unclosed ends 39 and 40 of the link, and the elements 36 and 38 serve to heat the section 41 of the limb opposite the ends 39 and 40.

It will of course be understood that the elements illustrated in Figure 2 are of a diagrammatic nature and that suitable modifications may be made to reduce the severity of the heating effect on the section 41 as compared with that on the ends 39 and 40. For instance, when the elements are moved into their operative position the parts 36 and 38 may be spaced further apart from each other than are the portions 35 and 37 so as to produce a less intense heating field.

As in the case of the current-carrying elements, the primary dies 20 and 21 may be moved together and apart by any suitable form of mechanism, which is preferably operatively connected with that employed for moving the current-carrying elements so that the operations thereof are performed in synchronism with each other.

The movements of these mechanisms are preferably also synchronized with feed movements imparted by the conveyor device to the extended length of chain so that the whole apparatus enables automatic and continuous production of chain to be effected.

Instead of employing only a single current-carrying structure and single die assembly, a plurality of each of these may be employed to operate against longitudinally spaced portions of the extended length of chain. For instance in a case where alternate links are unclosed, as shown in Figure 1, there may be two or three similar current-carrying structures 14 operating simultaneously in relation to successive links 11, and die assemblies such as that shown at 15 may be in registration with the closed links 10 but retained in the inoperative position whilst the current-carrying assemblies are operative.

In this arrangement feed movements imparted to the chain will be alternately long and short, the short steps corresponding to the distance between the centres of successive links 10 and 11.

The short steps enable links heated by the current-carrying structure to be brought into the operative range of the die assemblies disposed on the delivery side of associated current-carrying structures, and the long steps, which are performed subsequently to each short step, enable the whole series of then closed links to be fed clear of the series of current-carrying structures and die assemblies and a fresh extended length of chain brought into the operative range of the latter. In this arrangement the current-carrying structures and die assemblies do not move to their closed or operative position simultaneously, but move successively the former before the performance of each short step and the latter after the conclusion of each short step.

In the apparatus illustrated in Figures 5 and 6 links 10 and 11 are shown formed similarly to those shown in Figures 1 to 3 but it should be appreciated that links as shown in Figure 4 may be used.

The die assembly 15, diagrammatically illustrated, may comprise a pair of primary dies and a pair of secondary dies as previously described and illustrated but alternatively only a single pair of dies may be employed to exercise welding pressure inwardly towards the axes of the end portions and substantially over the whole of an annular zone extending around the outer surfaces of the end portions.

In addition to the dies aforesaid endwise operating dies 42 and 43 are provided for urging the end portions of the links into mutual contact in directions parallel with the axes of said end portions. The dies are suitably recessed to receive the ends proper of the link and the die 42 is also recessed to receive the limb of the link opposite the end portions to position said link.

The combination of inwardly and endwise operating dies ensures that the faces of the end portions are urged into mutual contact to provide a satisfactory weld.

The current-carrying structure for heating the link may be as described with reference to Figures 1 to 3.

It is contemplated that it would be possible to apply the welding pressure whilst the link is still subjected to the heating field, or whilst the field-forming elements are still in the operative position but when the current has ceased or been reduced; but it is preferred to apply the welding pressure to each link after it has been removed from the heating field or after the latter has been removed from the link. Problems arising from the heating of the pressure-applying members and the presence of the field-forming elements are thus eliminated.

It would be possible to utilise continuous endwise feed movement of the chain and arrange the heating field and pressure-applying means so that each either move with the chain whilst acting on spaced portions thereof and are subsequently returned to a starting or datum position or are each adapted to act on the chain whilst remaining stationary yet allowing the chain to move continuously. For instance the length of the heating field may be chosen in relation to the speed of movement of the chain to achieve the required degree of heating, and the pressure-applying means may be designed to allow the chain to move whilst applying pressure thereto by the incorporation in said means of pressure-applying rollers or the like which may be grooved to conform to the cross-sectional shape of the links.

What I claim is:

The process of uniting in a chain link the two opposed end portions comprising substantially aligning the end portions thereof so that the end faces present transverse jointing faces and subjecting the two opposed end portions to a high frequency electromagnetic heating field of substantially annular formation so as substantially to completely encircle the cross-section of said end portions, said field being such as to extend each side of the transverse jointing faces of the end portions longitudinally thereof and so that at any instant the field lies in a single sense substantially longitudinally in the two end portions with said field entering into and emerging from the portions around the complete peripheral surfaces thereof to obtain electro-magnetic saturation of said end portions over their entire cross-sectional areas with the maximum flux density being created at the transverse jointing faces of the end portions whereby said end portions become heated to a welding temperature which attains a maximum at said transverse jointing faces, and applying pressure to the end portions whilst in the heated condition to hold said end portions in mutual contact and to cause same to become welded together to form a closed chain link.

References Cited in the file of this patent

UNITED STATES PATENTS

| 451,797 | Baker | May 5, 1891 |
| 528,819 | Standish | Nov. 6, 1894 |
| 778,269 | Rietzel | Dec. 27, 1904 |
| 798,692 | Muller | Sept. 5, 1905 |
| 1,093,207 | Ryan | Apr. 14, 1914 |
| 1,490,647 | Thomson | Apr. 15, 1924 |
| 1,809,468 | Bornand et al. | June 9, 1931 |
| 2,280,689 | Denneen et al. | Apr. 21, 1942 |
| 2,288,494 | Speed | June 30, 1942 |
| 2,528,758 | King | Nov. 7, 1950 |
| 2,528,810 | Zimmerman | Nov. 7, 1950 |

FOREIGN PATENTS

| 655,400 | Great Britain | July 18, 1951 |
| 697,615 | Great Britain | Sept. 23, 1953 |